Figure 1:
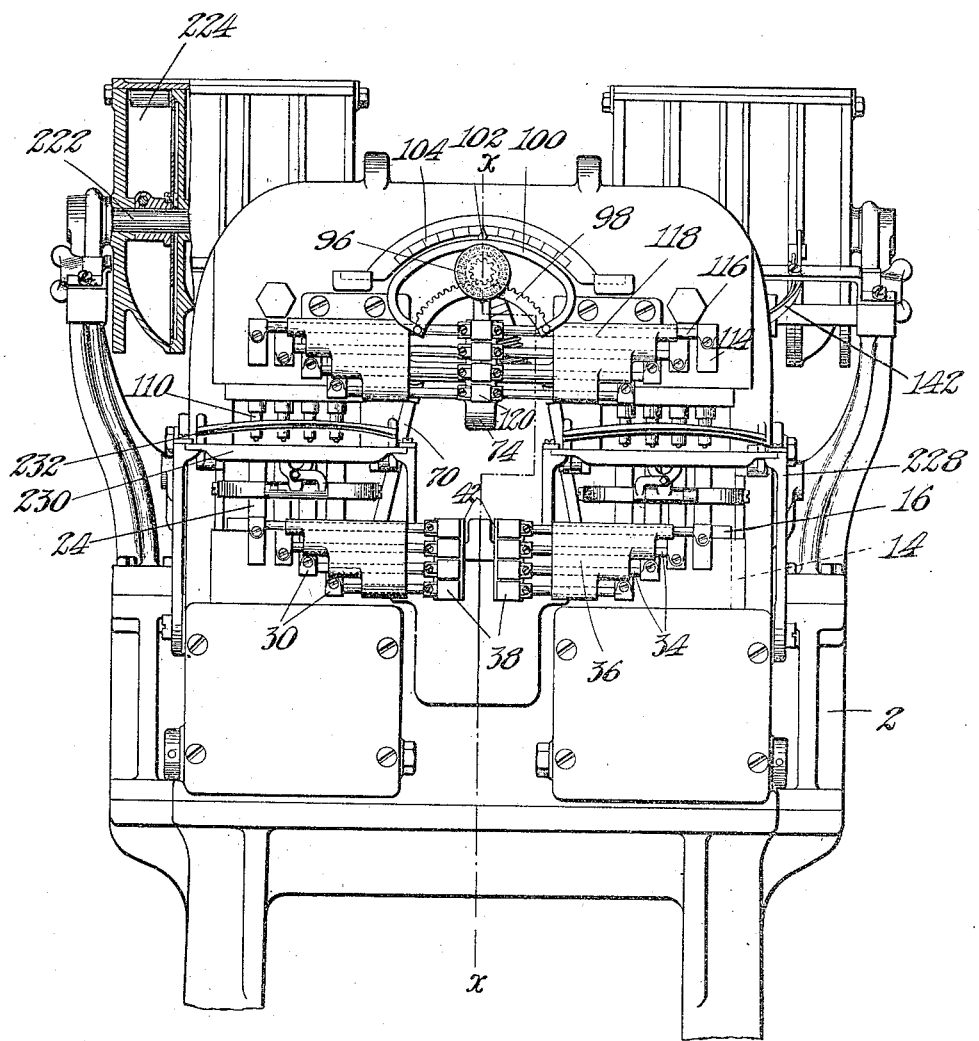

P. R. GLASS.
FASTENER SETTING MACHINE.
APPLICATION FILED MAR. 2, 1912.

1,195,807.

Patented Aug. 22, 1916.
7 SHEETS—SHEET 1.

WITNESSES:
Herbert W. Kenway.
William B. King.

INVENTOR
Perly R. Glass

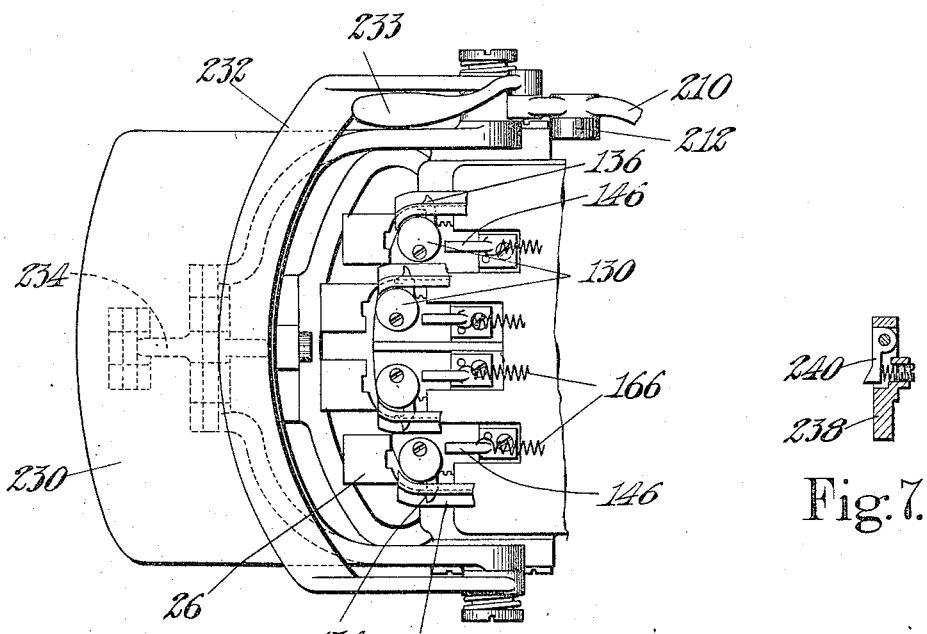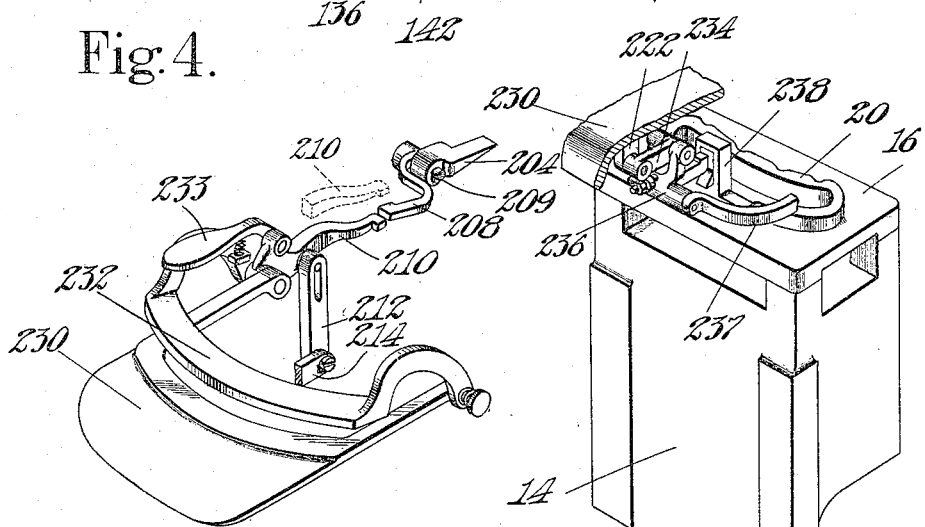

P. R. GLASS.
FASTENER SETTING MACHINE.
APPLICATION FILED MAR. 2, 1912.

1,195,807.

Patented Aug. 22, 1916.
7 SHEETS—SHEET 5.

WITNESSES.
Herbert W. Kenway.
William B. King.

INVENTOR.
Perley R. Glass

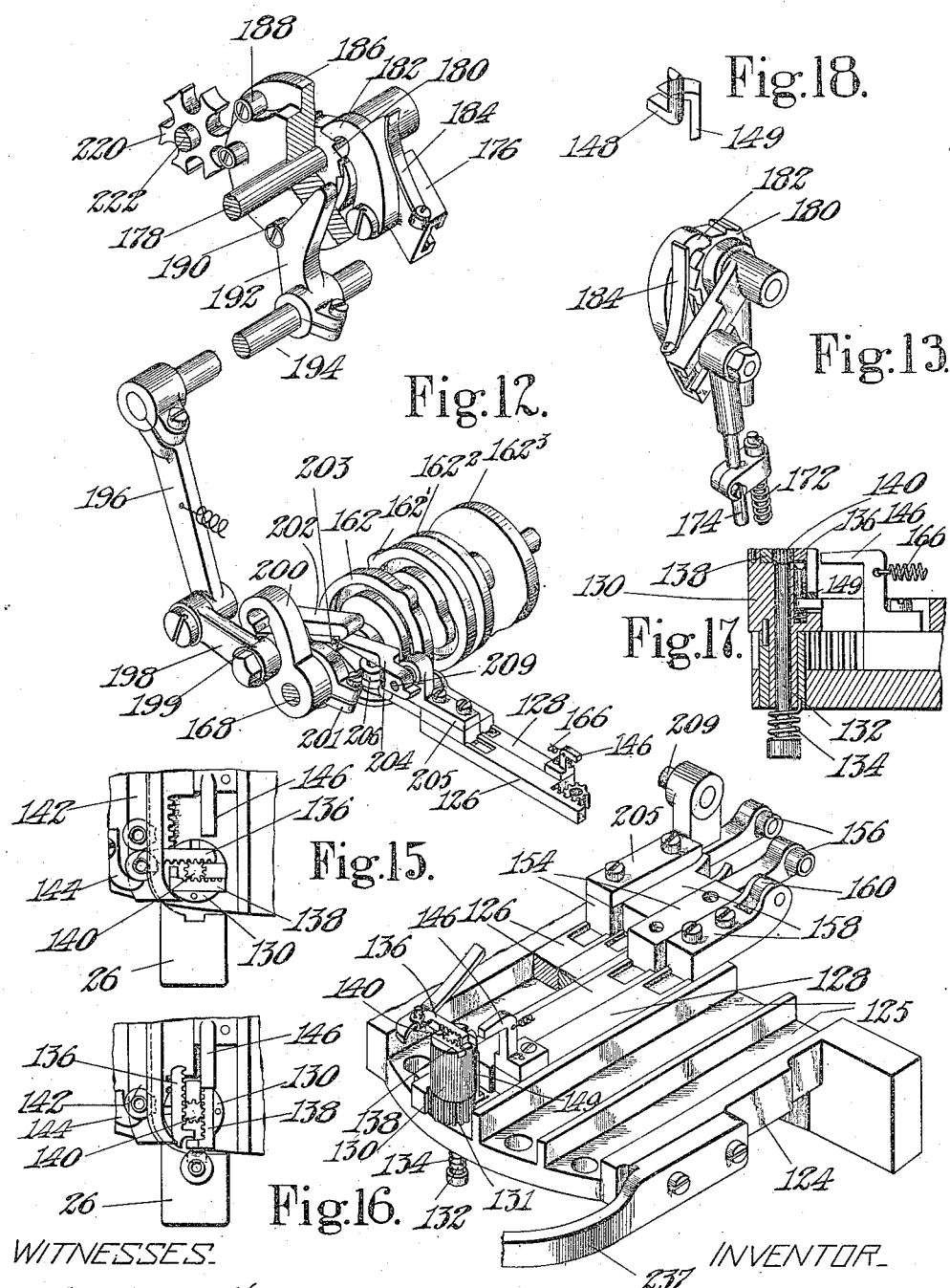

P. R. GLASS.
FASTENER SETTING MACHINE.
APPLICATION FILED MAR. 2, 1912.

1,195,807.

Patented Aug. 22, 1916.
7 SHEETS—SHEET 7.

WITNESSES_
Herbert W. Kenway.
William B. King.

INVENTOR_
Philip R. Glass.

UNITED STATES PATENT OFFICE.

PERLEY R. GLASS, OF BROOKLINE, MASSACHUSETTS, ASSIGNOR TO UNITED SHOE MACHINERY COMPANY, OF PATERSON, NEW JERSEY, A CORPORATION OF NEW JERSEY.

FASTENER-SETTING MACHINE.

1,195,807.   Specification of Letters Patent.   Patented Aug. 22, 1916.

Application filed March 2, 1912. Serial No. 681,134.

*To all whom it may concern:*

Be it known that I, PERLEY R. GLASS, a citizen of the United States, residing at Brookline, in the county of Norfolk and State of Massachusetts, have invented certain Improvements in Fastener-Setting Machines, of which the following description, in connection with the accompanying drawings, is a specification, like reference characters on the drawings indicating like parts in the several figures.

This invention relates to machines for simultaneously setting a series of fasteners in sheet material.

As herein shown the invention is embodied in a machine for setting lacing hooks in boots and shoes, although many of its features may be advantageously embodied in machines for setting eyelets, studs, or other articles and the term "fasteners" is used hereinafter to designate all such articles.

An important feature of the invention consists in automatically acting mechanism for spacing the various tools or instrumentalities, such as the sets or upsetting dies. By the use of such mechanism the operation of a machine of the gang type is rendered easy and convenient for the operator as the machine is adapted for handling work in which it is necessary to set the fasteners in one piece with one spacing and in another piece with a different spacing, as for example, in changing from shoes of one size to shoes of another size. It also simplifies the general construction of the machine in that it obviates the necessity for laterally adjustable raceways. In the machine embodying the present invention the setting dies may be supplied with fasteners while they are in a predetermined initial position and then the dies may be moved automatically in accordance with the required spacing carrying with them the previously received fasteners.

It is necessary or desirable in many cases to set the fasteners upon a curve and an important feature of the present invention consists in mechanism for moving the setting dies from their initial position, not only into the required spacing, but also to shift the position of the individual dies during this movement into accordance with the desired curve.

In the machine herein shown there are provided oppositely disposed coöperating gangs of setting devices, one gang of the pair being arranged to be spaced manually and the coöperating gang, which in the illustrated embodiment of the invention constitutes the gang of setting dies to which the hooks are supplied, being arranged to be spaced automatically.

Another feature of the invention consists in a single controlling device, such as a hand wheel, for spacing the dies of one gang and regulating the action of the automatic spacing mechanism upon the other gang.

An important feature of the invention consists in two pairs of coöperating gangs of setting devices constructed and arranged for setting lacing hooks or other fasteners in the right and left quarters respectively of a shoe and having the individual setting devices so correlated that their adjustment is controlled and regulated from the same controlling device. Such construction has not heretofore been embodied in gang fastener setting machines. It is, however, of great convenience to the operator in that it enables him to adjust the machine by one setting for its entire operation upon both sides of a shoe.

Another feature of the invention consists in the arrangement of the individual setting devices in their containers and in the means by which they are connected to the spacing mechanism. As herein shown each fastener-receiving die is mounted upon an independent carrier bar arranged within a chamber in a reciprocatory plunger and connection with the spacing mechanism is effected by rods or other connecting devices mounted in the machine frame and having a tongue and groove connection with each end of the carrier bars. By shifting the connecting rods the carrier bars are positively and accurately moved over the supporting surface of their containing chamber and are accurately maintained in their spaced position during the movement of the carrying plunger by reason of the tongue and slot connection above described.

Another important feature of the invention relates to a novel mounting of the setting devices whereby provision is made for adjustment for curvature and consists in arranging each setting device for longitudinal movement upon its respective carrier bar.

In such construction, spacing of the setting devices is secured by relatively moving the carrier bars bodily with their respective setting devices while the desired curvature of the gang is secured by shifting the setting devices upon their carrier bars.

Other important features of the invention relate to the mechanism for supplying fasteners to the setting device. As herein shown this mechanism includes a series of raceways arranged to supply the setting dies and means acting on the endmost fastener in one raceway after another to cause the fasteners to pass to the respective dies. It is believed that a gang fastener setting machine having a series of raceways has never before been provided with mechanism which operates successively to supply fasteners and any supplying mechanism whatever answering to this term should be considered as within the scope of the present invention.

The fastener supplying mechanism herein shown consists in a plurality of sets of hook handling members, each set having operative connection with a common actuator which operates successively upon the members to cause them to transfer one hook after another along raceways, into the respective setting devices, and finally to position the hooks so transferred within the setting devices. This construction constitutes an important feature of the invention and is particularly well suited for the requirements of the case since by it the hooks are handled and supplied accurately and quickly and without liability of becoming distorted or damaged.

Another feature of the invention consists in arranging the fastener supplying member first actuated to control the subsequent operation of the actuator and consequently the remaining sets of fastener handling members. As herein shown the actuator is driven through a ratchet mechanism and a shield is mounted upon the member first operated and is carried thereby into an inoperative position where it is retained until said member is returned to its initial position whereupon it interrupts the action of the ratchet mechanism and brings the supplying mechanism, as a whole, to rest.

In fastener setting machines as heretofore constructed it has been customary to supply the fastener, or fasteners, to be set to the setting devices after the machine has been started and prior to the setting operation. In accordance with one feature of the present invention, however, it is proposed to supply the fasteners to the setting devices as the final step in the cycle of operations and after one setting operation has been completed, so that when the machine comes to rest the fasteners have already been supplied to the setting devices and the machine is in readiness to effect the setting operation at once when restarted. This construction and method of operation is advantageous in that it reduces the interval during which it is necessary that the work should actually remain in the machine since the fastener supplying operation takes place automatically while the finished work is being removed.

The fastener supplying mechanism may be set in operation in any desired manner. As herein shown this is effected automatically by the movement of one of the gangs after the setting operation. In this connection another feature of the invention consists in the provision of a reciprocating plunger for one gang of setting devices having such connection with automatic fastener supplying mechanism that said mechanism supplying mechanism is set in operation by the movement of the plunger which separates the coöperating setting devices.

Another feature of the invention consists in improved mechanism for disengaging the clenched fasteners from the setting devices at the conclusion of the setting operation. To this end there is provided a work support which is movable transversely, so that, in the case of lacing hooks, the throat of the hook shall be carried off the anvil plate.

Another feature of the invention consists in the provision of mechanism for automatically causing such transverse movement of the work support so that the operator need give no attention to disengaging the work but has merely to remove it from the machine.

Still another feature consists in the provision of clamping means arranged to act automatically and hold the work in place both during the setting operation and while the work support is being moved transversely to disengage the fasteners from the setting devices. As herein shown a clamping member is movably mounted upon the work table and so connected with the plunger which carries the reciprocatory gang of setting devices that when the plunger is moved prior to the setting operation the work is clamped and so held until substantially the conclusion of the reverse movement of the plunger at which time the fasteners have been set and disengaged from the setting devices.

While the various combinations of the different instrumentalities of the machine above enumerated constitute important features of the present invention it should be understood that the separate instrumentalities involve many novel features and that the use of said instrumentalities in other combinations is contemplated and is within the scope of the present invention.

The various features of the invention will be best understood and appreciated from the following description and accompanying drawings of one form or embodiment of the invention selected for purposes of illustration.

Figure 2:
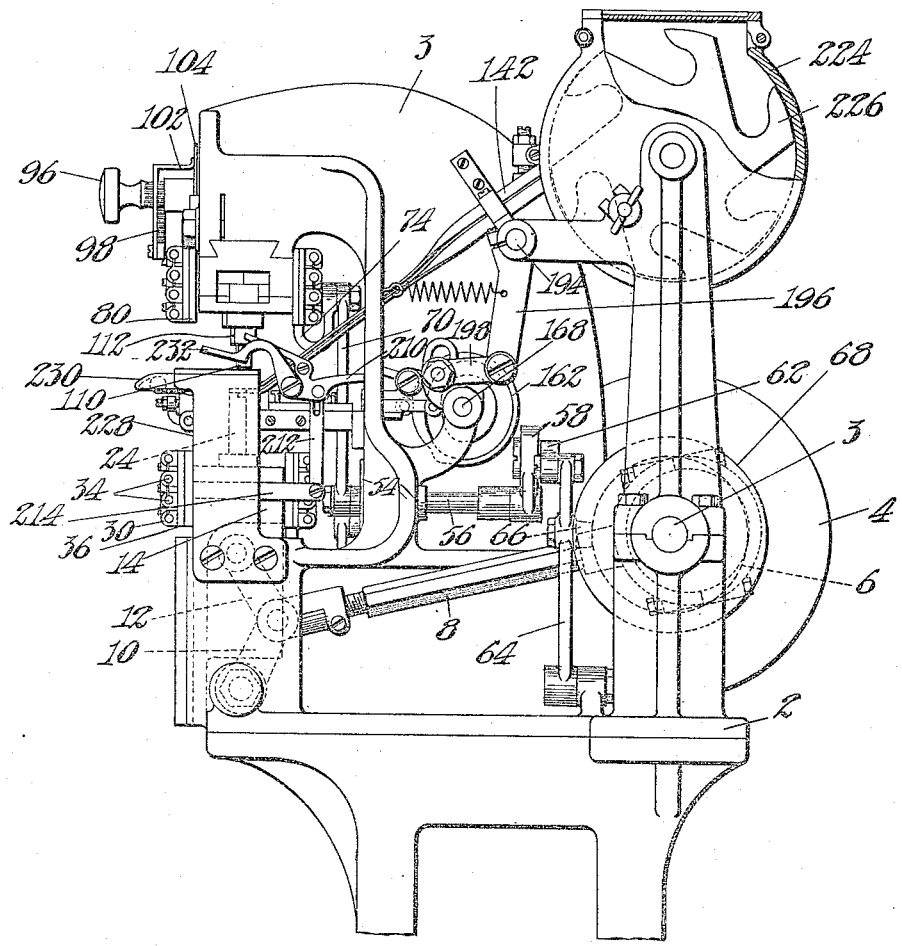
Figure 3:
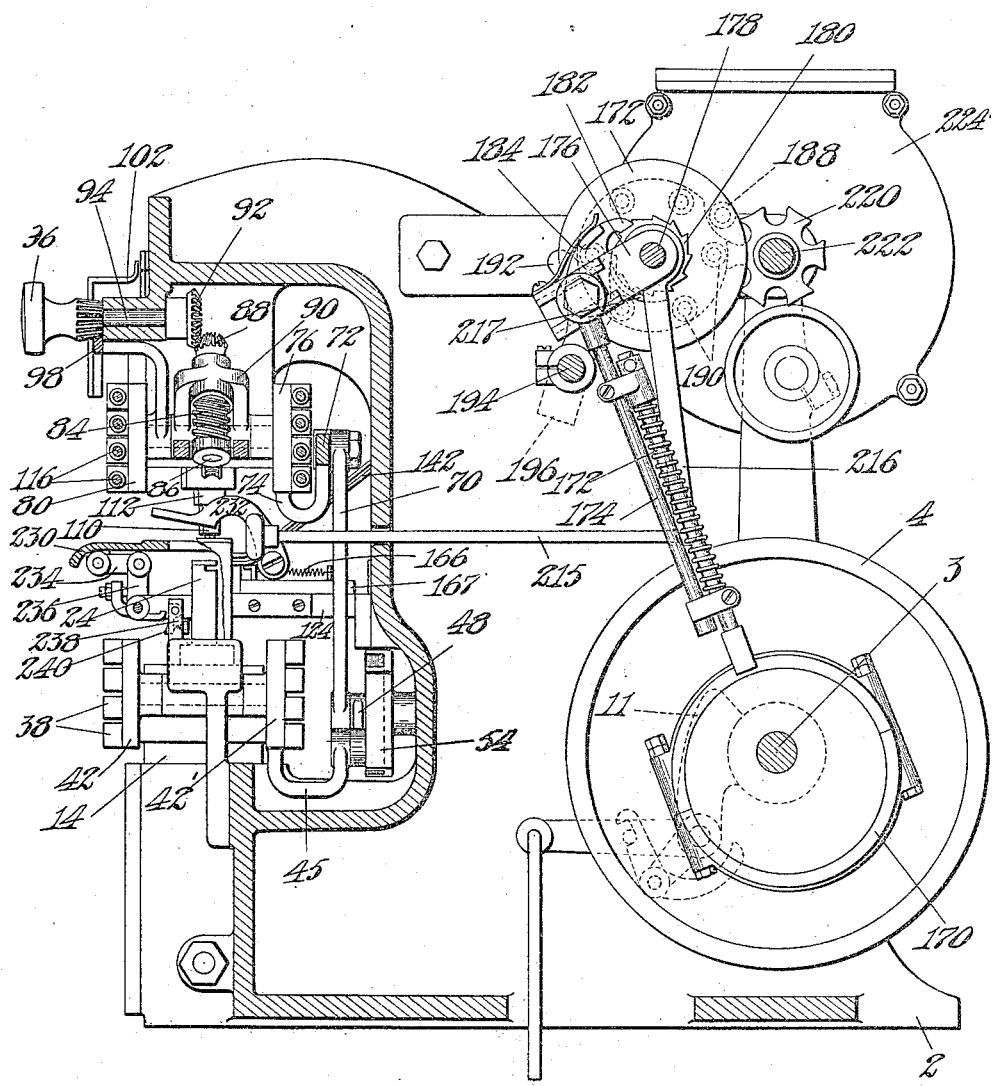
Figure 8:
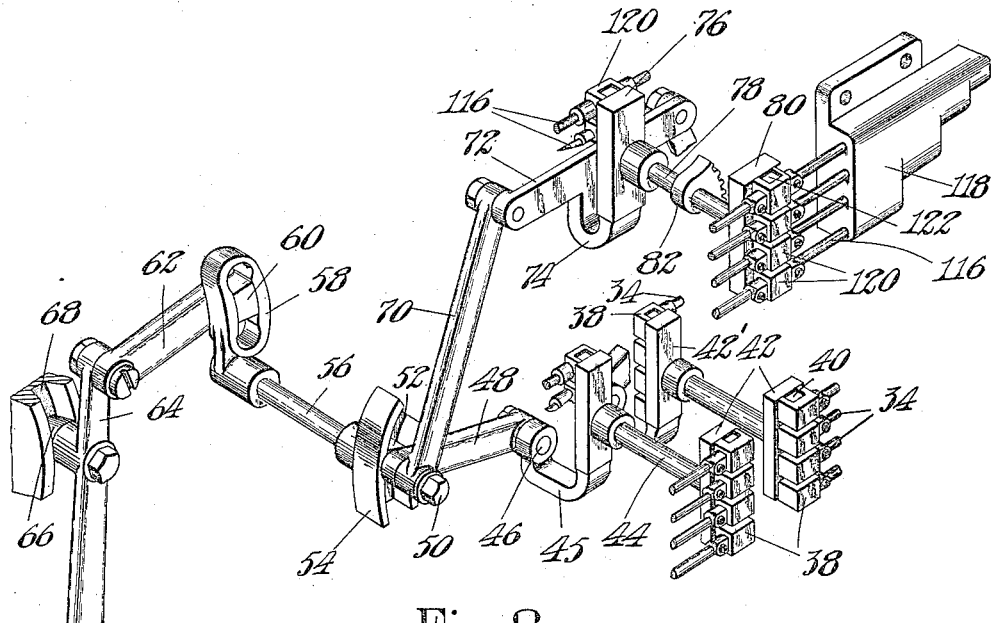
Figures 9, 10:
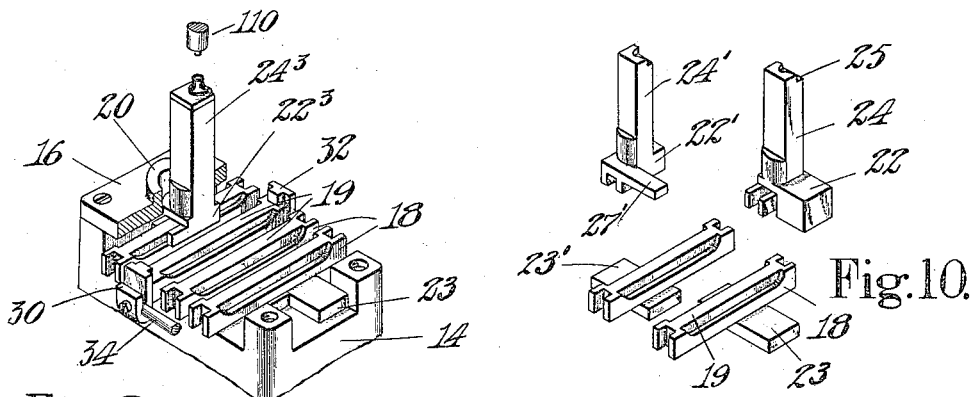
Figure 11:
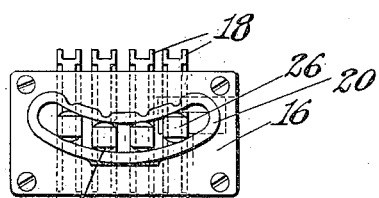
Figure 19:
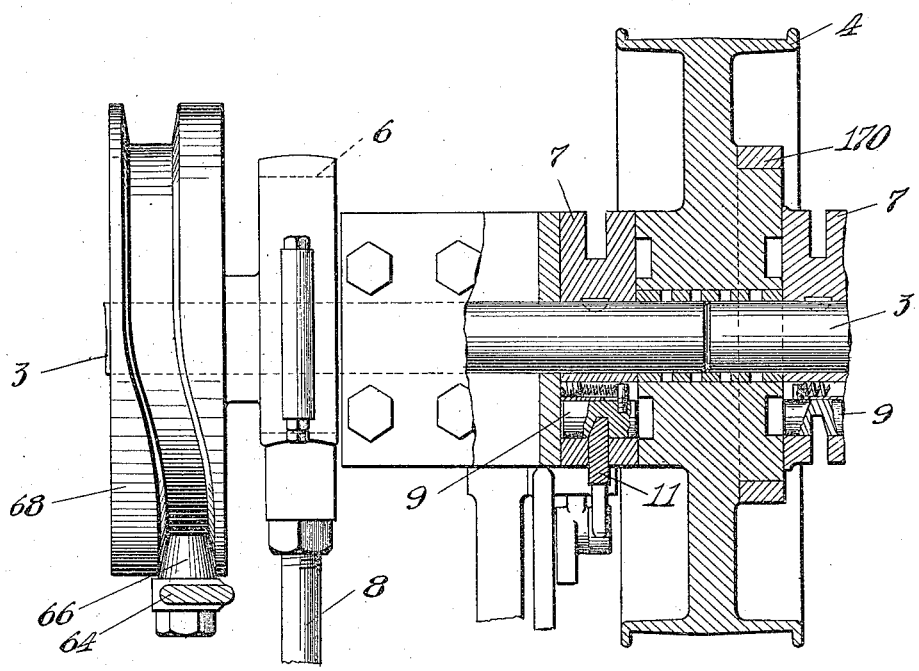

In the drawings,—Figure 1 is a view of the machine in front elevation; Fig. 2 is a view of the machine in side elevation; Fig. 3 is a sectional view of the machine on the line x—x of Fig. 1; Fig. 4 is a plan view of one of the work plates showing the lower sets and the hook transferring cylinders; Fig. 5 is a detail view in perspective of the work plate, presser foot and associated parts; Fig. 6 is a view in perspective of the lower set carrying plunger, showing also part of the work plate; Fig. 7 is a detail sectional view of part of the mechanism for laterally moving the work plate; Fig. 8 is a view in perspective of the mechanism for controlling the lateral position and spacing of the sets and upsetting dies; Fig. 9 is a view in perspective of the end of the set carrying plunger showing the arrangement of the set carrying bars; Fig. 10 is a view in perspective of two of the lower sets and their carrier bars in disassembled relation; Fig. 11 is a plan view of the upper end of the set carrying plunger; Figs. 12 and 13 are views in perspective of portions of the hook feeding mechanism; Fig. 14 is a view in perspective of the plate in which the transferring cylinders are journaled showing one of the cylinders and several of the actuating bars; Figs. 15 and 16 are plan views of a transferring cylinder in two different positions; Fig. 17 is a sectional view of one of the transferring cylinders and certain associated parts; Fig. 18 is a detail view of the retaining pin for the transferring finger of the cylinder and its releasing cam; Fig. 19 is a plan view, partly in section, of the driving shaft and the mechanism mounted upon it.

The machine herein shown has two separate series of hook setting instrumentalities, one arranged for setting a gang of hooks in a right quarter and the other to operate similarly upon a left quarter. Separate work supporting tables, presser feet, magazines for the hooks and hook supplying mechanism are associated with each series of setting instrumentalities and as these parts are all of similar character they will be described for convenience in singular terms.

The machine frame 2 is provided at its rear side with journals for the driving shaft 3 carrying at its center a loose pulley 4 to which power may be transmitted by a suitable belt. As shown in Fig. 19 the driving shaft comprises two independent parts either of which may be clutched to the driving pulley at the will of the operator to set in operation one side of the machine or the other. Any convenient form of clutch mechanism may be utilized. As herein shown each part of the driving shaft 3 carries a collar 7 which constitutes the fast member of a clutch and carries a sliding clutch bolt 9 which is permitted to enter a socket in the hub of the driving pulley when released by the wedge member 11 controlled through a treadle rod.

Upon each part of the driving shaft 3 is mounted an eccentric 6 which operates an eccentric rod 8 having an adjustable connection at its forward end with vertically disposed toggle links 10 and 12. The lower link 10 has an eccentric adjustable connection with the frame 2 and the upper link 12 is connected to the bottom of a reciprocatory plunger 14 which carries the lower sets 24, 24′, etc. The top of the plunger 14 has four corner posts to which is bolted a cap piece 16. A chamber is thus formed in the upper end of the plunger 14 and in this chamber are arranged a plurality of carrier bars 18 each of which has a vertical slot or guideway in its front and rear ends and a horizontally extending web 19. Upon each of the carrier bars 18 there is slidingly mounted one of the four lower sets 24, 24′, 24², 24³. Each set has at its lower end a block 22 in which is formed a horizontal guideway fitting over the web 19 of the corresponding carrier bar. Each of the lower sets has at its upper end a pocket 25 to receive the head of a hook and a hook sustaining or anvil plate 26. Each of the carrier bars 18 has a laterally extending projection 23, 23′, etc., and these projections are fitted together in the chamber of the plunger 14 in such a way as to prevent the carrier bars from tipping while still permitting them to be moved laterally. The two outer blocks 22, 22³ extend outwardly from the bottom of the set 24, 24³ and the inner blocks have laterally extending portions, one shown at 27′, which overlie the carrier bars 18 and prevent tipping of the sets while permitting them to be moved inwardly or outwardly on the carrier bars to vary their curvature. The lower sets may be arranged in a straight line or in a curve according to the requirements of the work in hand and their position is determined by the shape of a slot 20 formed in the cap plate 16. The cap plate may be removed and another substituted for it having a slot 20 of different curvature when it is desired to operate upon shoes having hooks set upon a different curvature from that determined by the original plate.

It is important that the sets should be capable of a ready lateral adjustment in order that their spacing may be quickly adjusted in changing from work of one size to work of another. One preferred example of mechanism for effecting this adjustment will now be described.

Adjacent to each end of the carrier bars 18 are located U-shaped pieces 30, 32 which are provided with vertical tongues arranged in engagement with the vertical grooves in the ends of the carrier bars. Each of the pieces 30, 32 is connected to a horizontal rod 34. A bearing bracket 36 is bolted to the face of the machine frame and provided with horizontal bearings for each rod 34. The tongue and groove connection between the vertically stationary pieces 30, 32 and the carrier bars 18 permits the bars to be carried upwardly by the plunger 14 in the setting operation without disturbing the operative connection so that lateral adjustment of the sets may be effected either before or during the vertical movement of the plunger 14. At its inner end each rod 34 is pivotally connected to a cap 38 fitting over a block 40. Each block 40 is pivotally connected to one of two normally vertical bars 42, 42' carried on either end of a horizontal rock shaft 44. The bar 42 is connected through rods 34 with the front ends of the carrier bars 18 while the bar 42' is similarly connected to the rear ends of these bars. The rear bar 42' is provided at its lower end with a rearwardly extending U-shaped projection 45 carrying a horizontal pivot pin 46. The pivot pin 46 is connected through a link 48 with a second pin 50 projecting from a sliding piece 52 adjustably mounted in a segmental guideway formed in a curved rocker 54, see Fig. 8. The rocker 54 is rigidly connected to the forward end of a second rock shaft 56 carrying on its rear end a normally vertical arm 58 having a segmental guideway formed therein. Disposed within the guideway of the arm 58 is a sliding piece 60 pivotally connected at its rear side with a link 62 which in turn is pivotally connected to the upper end of a cam lever 64. The cam lever 64 is oscillated by a cam roller 66 running in a cam 68 on the driving shaft 3, see Fig. 19.

In the initial position of the machine the slide 52 and pivot pin 50 are disposed in alinement with the axis of the rock shaft 56 so that rocking movement of this shaft imparts no movement to the link 48 or to the bars 42, 42'. With the slide 52 in normal position therefore, the operation of the cam 68 has no effect upon the lateral position of the lower sets. However, if this slide is moved out of alinement with the axis of the rock shaft 56 it will be seen that more or less turning movement will be imparted to the bars 42, 42' and that the spacing of the lower sets will be correspondingly varied. It will be understood that the bars 42, 42' are supported by and turn with the horizontal rock shaft 44 which therefore constitutes their axis, and that the blocks 40 to which the set shifting rods 34 are connected are arranged in pairs at equal distances from this axis, that is, the two outer blocks 40 are equal distances above and below the axis and the inner blocks while nearer to the axis are disposed at equal distances from it. When the bars 42, 42' are turned the two outer sets 24 of each series are moved outwardly and the two inner sets are moved in the opposite direction so that the spacing between the sets is uniformly increased. This movement is effected accurately and uniformly by reason of the construction and arrangement of the carrier bars and the shifting rods 34, the bars 18 being positively engaged at both ends and moved upon a smooth supporting surface which constitutes the floor of the chamber in the upper end of the plunger 14.

Adjustment of the slide 52 in the segmental guideway of the rocker 54, to control the amount of movement imparted by the cam 68 to the bars 42, 42', is effected through a link 70 pivotally connected at its upper end to a cross bar 72. The cross bar 72 is arranged to turn about a horizontal central axis and has a rearwardly extending U-shaped projection 74 on its lower edge which connects it to a vertical bar 76. A boss is provided on the front side of the bar 76 and in this boss is rigidly secured a horizontal rock shaft 78 extending forwardly and similarly connected to a second vertical bar 80. The rock shaft 78 is journaled in the upper part of the machine frame and supports the cross bar 72 together with its connected mechanism. Between the bars 76 and 80 the shaft 78 carries a segment 82 of a worm wheel which meshes with a worm 84 on a short inclined shaft 86 which carries at its upper end a bevel gear 88. The inclined shaft 86 has journal bearings in a yoke-shaped piece 90 formed integral with the sleeve which surrounds part of the shaft 78. The beveled gear 88 upon the upper end of the shaft 86 meshes with a bevel gear 92 upon the rear end of a horizontal controlling shaft 94 carrying upon its forward end a hand wheel 96 by which it may be manually set in accordance with the spacing desired. The hand wheel 96 is provided with a toothed hub which meshes with a segmental rack 98 constituting part of a frame 100 which carries a pointer 102 arranged to indicate the position of the controlling shaft upon a scale 104 on the front of the machine frame. The scale 104 therefore indicates the spacing of the lower sets 24, 24', etc., as effected by the mechanism above described and also the spacing of the upper sets or upsetting dies as effected by mechanism which will now be described.

Upsetting dies 110 are carried on the lower ends of posts or stems 112 which in all material particulars, correspond to the stems or posts of the lower sets 24, 24' etc., and are mounted in a frame 108 dovetailed into the upper part of the machine frame, as shown in Fig. 2. The upsetting dies are mounted for lateral adjustment in a curved path in this frame in a manner similar to that in which the lower sets are mounted in the chamber of the plunger 14. The mounting for the upsetting dies is not shown in detail to avoid confusion but the general arrangement is apparent from the showing of Fig. 2.

Each of the carrier bars for the upsetting dies 110 is connected at its ends with tongued pieces 114, similar to the pieces 30, 32 above described, and these pieces are connected to transverse shifting rods 116 journaled in bearing brackets 118 on the machine frame and connected at their inner ends to caps 120 which fit over blocks 122 pivotally connected to the vertical bars 76 and 80 above described. These bars, as has already been intimated, are tipped about a horizontal axis when the hand wheel 96 is turned and the upsetting dies of both sides of the machine are shifted laterally an amount determined by the angular movement of the bars. It will be noted that, whereas in the case of the lower sets each gang was connected to a separate spreading bar and automatically controlled by the movement of its bar, in the case of the upsetting dies both gangs are connected to the same spreading bar and their spacing is effected manually and directly by the angular movement of this bar.

After each setting operation a hook is delivered to each of the lower sets 24, 24', etc., thus preparing the machine for operation upon a new piece of work. One example of hook delivering mechanism constructed in accordance with the present invention will now be described.

Bolted to the front of the machine frame in a position adjacent to the upper end of the lower sets when the plunger 14 is in its lower position is a horizontal plate 124 provided with a series of guideways 125, one disposed opposite to each set. In each guideway 125 is slidingly mounted a pair of actuating bars 126, 128 and in the forward end of each guideway is rotatably mounted a hook transferring cylinder 130. Journaled concentrically within each cylinder 130 is a vertical shaft 132 surrounding the lower end of which is a torsion spring 134, shown in Figs. 14 and 17, which acts, when permitted, to turn the shaft 132 into its initial position. In the upper end of the cylinder 130 is formed a pair of parallel guideways in one of which is mounted a sliding transferring finger 136 and in the other a pushing finger 138. The fingers 136 and 138 are provided on their inner edges with rack teeth meshing with a small pinion 140 fast upon the upper end of the shaft 132 by which the fingers may be moved laterally in opposite directions in their respective guideways. The machine is provided with a separate raceway 142 for each set and the delivery end of a raceway extends into proximity to each hook transferring cylinder 130 and is curved at its lower end so as to impart a partial turn to a lacing hook and deliver it with its open side in advance. Each raceway comprises a pair of rails one of which is engaged by the throat of the hook and the other is slightly elevated and arranged to engage the barrel of the hook and prevent it from sliding off the rail first mentioned. Both rails of the raceway terminate at a point adjacent to the receiving edge of the anvil plate 26.

The hooks are supplied to the upper end of each raceway 142 and descend by gravity until stopped by a spring pressed detent 144 near the delivery end of the raceway and in such a position that the lowermost hook may be engaged by the transferring finger 136 when it is extended on the cylinder 130 as shown in Fig. 15. During the rotation of the cylinder the hook is carried along the curved portion of the raceway and upon the anvil plate 26 of the lower set. Rotation of the transferring cylinder 130 is effected by the reciprocation of the bar 126 which for this purpose is provided with rack teeth meshing with a pinion 131 rigidly secured to the lower end of the cylinder 130. After the cylinder 130 has been turned from the position shown in Fig. 15 to the position shown in Fig. 16 and the transferring finger 136 has carried a hook to the plate 26 the other slide bar 128 is advanced. This bar carries at its front end an upwardly and forwardly projecting finger 146 which engages the rear end of the pushing finger 138 after the cylinder has been turned to transfer the hook to the set. In the forward movement of the bar 128 the pushing finger 138 is advanced and in this movement the hook is seated firmly upon the anvil plate 26. The forward movement of the pushing finger 138 under the actuation of the slide 128 retracts the transferring finger 136 by rotating the small pinion 140 which meshes with the latter finger and places the torsion spring 134 under tension at the same time. On the lower surface of the finger 136 are provided ratchet teeth and a spring locking pin 148 is yieldingly mounted beneath this finger and acts to retain it in its inner or retracted position. To depress or retract the locking pin 148 and so permit the torsion spring 134 to rotate the pinion 140 and advance the transferring finger 136 there is provided a small wedge cam 149 which is located at the rear side of the cylinder 130 in such position as to act upon the locking pin 148 when the cylinder 130 has been turned back to its initial position, as shown in Figs. 14 and 15. When this occurs the transferring finger 136 flies outwardly and engages the endmost hook upon the raceway.

As has been already intimated, an important feature of this invention consists in supplying hooks successively to the separate sets of each gang and in so arranging the machine that the hooks are supplied after each setting operation so that when the machine comes to rest it is in condition to operate immediately upon a new piece of work. One preferred form of mechanism for effecting these results will now be described.

Upon the rear end of each bar 126 is adjustably mounted a block 154 carrying a cam roller 156 and a similar block 158 is mounted upon each of the bars 128 and provided with a cam roller 160. The rollers 156 are arranged to run in cam tracks cut in the side surfaces of cams 162, 162', 162² and 162³ which act at the proper time to advance or retract the slide bars 126. Each roller 160 runs upon the periphery of one of the cams 162 etc. and is acted upon at the proper time by a projecting portion of the cam to advance the slide 128, while reverse movement of the slide is caused by tension spring 166 connected at its rear end to a pin on the cover plate 167 which covers the guideways 125 in the plate 124. The cams 162 etc. are rigidly mounted upon a horizontal cam shaft 168 disposed transversely of the machine and each cam is arranged substantially 90° in advance of the next so that they operate successively at each one-quarter revolution of the cam shaft.

The cam shaft 168 is intermittently rotated at the proper time from the driving pulley 4 through the following mechanism:—Upon one side of the hub of the driving pulley is formed an eccentric which acts through the eccentric strap 170 to oscillate an offset eccentric rod 172. The rod 172 is yieldingly connected with a second rod 174 which is adjustably connected with a crank arm 176 pivotally mounted on an intermediate shaft 178. The shaft 178 carries a ratchet wheel 180 with which co-operates a dog 182 pivotally mounted upon the crank arm 176 and held in engagement with the teeth of the ratchet wheel by a leaf spring 184. Continuous rotation of the pulley 4 therefore effects an intermittent rotation of the shaft 178 as will be apparent from Figs. 3 and 13. Rigidly secured to the shaft 178 is a disk 186 having a cut away portion in which is mounted a roller 188. A series of similar rollers 190 are mounted on the face of the disk and are arranged to act upon an arm 192 rigidly secured to a rock shaft 194 journaled in the machine frame. The rock shaft 194 has secured to its outer end a downwardly extending arm 196 which is connected through a link 198 with a slotted arm 200 rigidly secured to a pawl carrier 201 and loose with it upon the outer end of the cam shaft 168. It will be seen by reference to Fig. 12 that the intermittent rotation of the disk 186 effects an oscillatory movement of the shaft 194 and of the pawl carrier 201. The arm 200 is slotted and the link 198 is connected to it through an adjustable sliding piece 199 by shifting which the extent of oscillation imparted to the pawl carrier 201 may be regulated.

The pawl carrier has pivotally mounted upon its rear end a pawl 202 which, when permitted, acts upon a ratchet wheel 203 fast to the cam shaft 168 and in each of its oscillations turns the cam shaft through somewhat less than 90°. As will be apparent from the mechanism already described, one complete revolution of the cam shaft 168 results in the successive delivery of a hook to each of the sets 24, 24', etc., of one of the gangs. In accordance with the present invention mechanism is provided for imparting this movement to the cam shaft 168 at the conclusion of the setting operation and mechanism is also provided for preventing movement of the cam shaft as soon as the sets have been supplied. One preferred form of mechanism for effecting these results will now be described.

Upon the outer slide bar 126 is mounted a bracket 205 carrying a horizontal journal pin 209 upon which is loosely mounted a wedge-shaped shield 204 which, when the slide bar 126 is in its rearmost position, is interposed between the pawl 202 and the teeth of the ratchet wheel 203 so that the oscillation of the pawl is idle and has no effect upon the cam shaft 168. At its forward end the shield 204 is provided with a tail which stands in the path of a bent arm 208, see Fig. 5, by depressing which the shield 204 may be raised so that instead of riding upon the upper surface of the shield the pawl 202 in its oscillation will advance beneath the shield and act upon the ratchet wheel 203 to turn the cam shaft 168. In the first part of its revolution the cam 162 acts upon the sliding bar 126 to advance it thus rotating one of the cylinders 130 and conveying a hook from the raceway to the anvil plate 26. As will be apparent this forward movement of the bar 126 carries the shield 204 out of range of the pawl 202 so that the latter will continue to act and intermittently rotate the cam shaft 168 until the bar 126 has been returned to its rearmost position. The cam 162 is shaped so as to maintain the bar 126 in its forward position until each of the other cams has acted and supplied all the sets of the gang. In the final movement of the cam shaft 168 the outer slide bar 126 is retracted whereupon the shield 204 again becomes operative to prevent the pawl 202 from acting upon the ratchet wheel 203. The reciprocation of the outer bar 128, that is the companion bar of the bar which carries the shield 204, occurs in regular order with the operation of the other bars 128, the only irregularity being in the operation of the bar 126 which carries the shield, and which is maintained in its forward position while the other bars are reciprocated.

The bent arm 208 may be operated in any desired manner to cause the shield 204 to become inoperative and the hook supplying operation to take place. As herein shown a manual means and also automatic means are provided for effecting this result. The automatic means are arranged to operate at the conclusion of the downward movement of the plunger 14 and to this end a lever 210 is pivoted upon an arm extending rearwardly from one side of each work table 230 and its rear end is arranged to engage the forward end of the bent arm 208 when it is swung downwardly about its pivot. The lever 210 has a pin and slot connection with a vertical rod 212 pivotally connected at its lower end to a horizontal rod 214 rigidly secured to one side of the plunger 14. At the conclusion of the upward movement of the plunger 14 the rod 212 swings the lever 210 upwardly and the latter lifts the bent arm 208 idly and then lets it drop back to its normal position, while the lever 210 itself passes into the position indicated in dotted lines in Fig. 5 above the end of the bent arm 208. During the downward movement of the plunger 14 the end of the lever 210 engages and depresses the bent arm 208 thereby elevating the shield 204 and initiating the hook supplying operation. At the conclusion of the downward movement of the plunger 14 the end of the lever 210 is carried past the end of the bent arm 208 and the latter resumes its initial position resting upon the tail of the shield 204 which has swung downwardly but held in a forward and inoperative position upon the bar 126. The ends of the lever 210 and the bent arm 208 are offset in opposite directions so that when the bent arm 208 and the shield are carried forwardly by the bar 126 the effective connection between the arm 208 and lever 210 is interrupted. In order that the shield 204 may be manually moved into an inoperative position a handle 233 is secured to the lever 210 by which it can be swung upon its pivot at any time, for instance to cause the hook supplying operation to take place when the machine is started for the first time.

Each of the work tables 230 is mounted to slide forwardly and rearwardly in horizontal guideways formed in the inner edges of vertical standards 228 secured to the sides of the machine frame. A presser foot or work clamping member 232 is pivotally mounted upon each work table and is arranged to be moved automatically toward the table to engage and hold the work preliminarily to the setting operation. This movement of the presser foot may be secured by a connection with the vertical rod 212 and, as herein shown, the lever 210 is secured to the presser foot so that when the latter is swung upwardly near the conclusion of the upward movement of the plunger 14 the presser foot is moved downwardly into engagement with the work. The pivotal connection between the rod 214 and the slide rod 212 permits the horizontal movement of the work table without interrupting the connection with the arm 210. In order to disengage the clenched hooks from the anvil plates the work table with the work clamped upon it is arranged to be moved rearwardly during the initial part of the downward movement of the plunger 14. To this end a bell crank lever 236 is mounted between the forward ends of a pair of arms 237 secured to the sides of the plate 124 and is connected through the link 234 with a boss upon the under side of the work table 230. A standard 238 projects from the upper side of the plunger 14 and carries a pivoted dog 240 as shown in Fig. 7. During the upward movement of the plunger 14 the dog 240 is pressed inwardly by the end of the horizontal arm of the bell crank lever 236, no movement being imparted to the work table. During the downward movement of the plunger 14, however, the under side of the dog 240 engages the horizontal arm of the bell crank lever 236 and swings it downwardly thereby sliding the work table inwardly a distance sufficient to carry the clenched hooks clear of the anvil plates 26.

In order to supply hooks to the several raceways 142 a hopper 224 is provided at the upper end of each raceway and within each hopper is rotatably mounted a separator plate 226 which separates the hooks from the mass contained promiscuously in the hoppers and delivers them to the upper ends of the raceways. The separator plates 226 are mounted upon a transverse shaft 222 which carries at its inner end a star wheel 220. The star wheel is intermittently rotated by the stud or roller 188 mounted upon the side of the disk 186 as already explained.

It will be seen that in the normal operation of the machine the continuous rotation of the driving pulley 4 effects an intermittent rotation of the shaft 178 which keeps in motion the separators in the hoppers and also the pawl 202 of the hook delivering mechanism. In order that these parts of the machine may be brought to rest without the necessity for stopping the driving pulley 4 means are provided for rendering inoperative the pawl 182 which acts upon the ratchet wheel 180 of the shaft 178. To this end a downwardly extending arm 216 is pivotally mounted upon the shaft 178 and a shield 217 is mounted upon this arm which may be interposed between the pawl 182 and the ratchet wheel 180 by swinging the arm 216 forwardly. A horizontal operating arm 215 is secured to the lower end of the arm 216 and extends through the front side of the machine frame where it is provided with a handle arranged in convenient reach of the operator.

Having now explained in detail the construction of the machine and its general organization, its operation will now be briefly outlined.

Having determined the desired spacing of the hooks to be set the hand wheel 96 is turned until the pointer 102 indicates such spacing upon the scale 104. The setting of the pointer immediately effects spacing of the upsetting dies of both gangs by turning the bars 76 and 80 and shifts the sliding piece 52 out of alinement with the axis of the rock shaft 56 a distance proportional to the spacing to be effected subsequently and automatically in the sets of each lower gang. The lower sets have already been supplied with hooks at the conclusion of the previous operation so that the machine is now in readiness to receive new work. One quarter of a shoe upper is now placed upon the left hand work table 230 being properly positioned by gages, not shown, and the treadle is operated to clutch the left hand part of the driving shaft 3 to the rotating pulley 4. The plunger 14 is then elevated by the toggles shown in Fig. 2 and simultaneously the cam 68 acting through the mechanism illustrated in Fig. 8 operates to turn the bars 42, 42' and spread the lower sets laterally into alinement with the previously adjusted upsetting dies. The presser foot 232 is also swung into engagement with the work so that by the time the barrels of the hooks held in the ascending sets 24, 24', etc., have encountered the work the latter is clamped securely in position. It will be understood that the work table 230 is so disposed with respect to the upsetting dies that work placed upon it just clears the lower ends of the dies so that the hooks may be forced through the work and clenched against the upsetting dies without displacing the work vertically to any appreciable extent. The continued upward movement of the plunger 14 therefore results in clenching the hook barrels against the upsetting dies. After the setting operation has been completed the plunger 14 begins to descend and almost immediately the work table 230 is given its inward movement to disengage the clenched hooks from the anvil plates. The slight downward movement of the plunger 14 before the inward movement of the work table occurs is sufficient to carry the clenched hooks out of engagement with the upsetting dies. Immediately thereafter the presser foot 230 is raised to disengage the work which is then free to be removed from the machine. In the downward movement of the plunger 14 the bent arm 208 is depressed in the manner explained and the shield 204 moved into its inoperative positiontion thus setting in operation the transferring mechanism. The outer bars 126 and 128 are operated and a hook is transferred from the outer raceway, delivered to the outer anvil plate 26 and seated firmly in place by the pushing finger 138. The second pair of bars 126, 128 is then operated to supply the second anvil plate 26, and so on until each set of the lower gang has been supplied, whereupon the outer bar 126, which has been held in its forward position during the supplying operation, is moved rearwardly and the cam shaft 168 brought to rest. Meanwhile the other quarter of the shoe has been similarly presented to the right hand gang of setting instrumentalities and hooks are set in this quarter in a manner similar in all respects to that already outlined.

No punches are shown in the machine herein illustrated and in dealing with most varieties of material none will be found necessary as the hook barrels act upon the material to cut out their own holes, but it is not outside the scope of the present invention to provide punches of any desired character, either as a part of the upsetting dies or as separate devices.

Having described my invention, what I claim as new and desire to secure by Letters Patent of the United States is:—

1. A machine for setting fasteners, having, in combination, oppositely disposed gangs of setting devices, a series of stationary raceways for supplying fasteners to the devices of one gang, and automatically acting mechanism for varying the spacing of the devices of one gang from the spacing of the stationary raceways.

2. A machine for setting fasteners, having, in combination, oppositely disposed gangs of setting devices, a series of stationary raceways for supplying fasteners to the setting devices of one gang, and automatically acting mechanism for varying the spacing of the setting devices of one gang from their spacing during the fastener receiving operation.

3. A machine for setting fasteners, having, in combination, two pairs of oppositely disposed gangs of setting devices, manually operated means for spacing the setting devices of one gang of each pair, and automatically acting mechanism for spacing the setting devices of each of the other gangs.

4. A machine for setting fasteners, having, in combination, a plurality of pairs of oppositely disposed gangs of setting devices, and means for simultaneously varying the spacing of the setting devices of one gang of each pair.

5. A machine for setting fasteners, having, in combination, a plurality of pairs of oppositely disposed gangs of setting devices, means for simultaneously varying the spacing of the setting devices of one gang of each pair, and automatically acting mechanism for spacing the setting devices of each of the other gangs.

6. A machine for setting fasteners, having, in combination, a pair of driving elements either of which may be set in operation at the will of the operator, two pairs of coöperating gangs of setting devices, one gang of each pair being connected respectively to the different driving elements, and means for simultaneously spacing the setting devices of the corresponding gang of each pair.

7. A machine for setting fasteners, having, in combination, a reciprocatory plunger carrying transversely movable setting devices, and automatically acting spacing mechanism including a member arranged to turn about a stationary axis and having connection with each of the setting devices.

8. A machine for setting fasteners, having, in combination, a gang of setting devices mounted for reciprocation to effect the setting operation and also to permit relative lateral adjustment, a carrying bar for each setting device having a vertical groove in each end, a tongued guide member fitting each groove, and a spacing member arranged to turn about a stationary axis and having independent connection with each guide member.

9. A machine for setting fasteners, having, in combination, a frame, a reciprocatory plunger carrying a plurality of relatively movable carrier bars, a setting device mounted on each bar, and means mounted upon the frame and connected to said carrier bars at their opposite ends whereby their spacing may be adjusted.

10. A machine for setting fasteners, having, in combination, a frame, a reciprocatory plunger carrying a plurality of relatively movable carrier bars, a setting device mounted on each bar, and spacing members mounted upon the frame and having a tongue and groove connection with each carrier bar on opposite sides of its setting device.

11. A machine for setting fasteners, having, in combination, a reciprocatory plunger carrying a plurality of carrier bars movable laterally for adjustment, a setting device mounted on each carrier bar and movable longitudinally thereof, and spacing means for bodily shifting the carrier bars with the setting devices thereon.

12. A machine for setting lacing hooks having in combination, a gang of hook-carrying sets, a gang of raceways one leading toward each set and each arranged to hold a line of hooks, and means acting on one raceway after another for releasing the endmost hook and permitting it to move into the corresponding set.

13. A machine for setting fasteners, having, in combination, a reciprocatory plunger, carriers for setting devices mounted in the plunger and extending from one side to the other, and spacing mechanism having connection with each carrier at both sides of the plunger.

14. A machine for setting fasteners, having, in combination, a plurality of relatively adjustable carriers for setting devices, and spacing mechanism having a separate connection with opposite sides of each carrier.

15. A machine for setting fasteners, having, in combination, a plurality of relatively adjustable carriers for setting devices, and spacing mechanism including rods having a tongue and groove connection with the opposite sides of each carrier.

16. A machine for setting fasteners, having, in combination, a reciprocatory plunger having a plane supporting face, a plurality of carrier bars disposed on said supporting face and having interlocking projections at their lower sides to prevent tipping, and spacing mechanism including means for simultaneously sliding the carriers upon the supporting face of the plunger.

17. A machine for setting fasteners, having, in combination, a reciprocatory plunger having a plane supporting face, a plurality of carriers disposed on said supporting face, and spacing mechanism including means mounted independently of the plunger and connected to opposite ends of the carriers for controlling the positions of the carriers during the movement of the plunger.

18. A machine for setting fasteners, having, in combination, a reciprocatory plunger having a carrier for a setting device mounted therein for bodily transverse movement, and a laterally adjustable controlling device having a tongue and groove connection with the carrier and acting during the movement of the plunger to determine the transverse position of the carrier.

19. A machine for setting fasteners, having, in combination, a reciprocatory plunger having a gang of loosely mounted setting devices, a plate having a curved surface for determining the line of curvature of the gang of setting devices, and means for automatically moving the setting devices whereby the disposition or arrangement thereof is varied more or less from a straight line.

20. A machine for setting fasteners having, in combination, a gang of setting devices, each device being independently movable so that the disposition or arrangement thereof may be varied more or less from a straight line, and mechanism acting automatically on the setting devices for so varying their arrangement.

21. A machine for setting fasteners, having, in combination, a plurality of carriers relatively movable for various spacings, a setting device movable upon each carrier to vary the disposition or arrangement of the devices more or less from a straight line, and automatically acting spacing mechanism operating to shift the carriers and simultaneously to cause movement of the setting devices upon their carriers.

22. A machine for setting fasteners, having, in combination, a gang of fastener carrying devices movable relatively for spacing and curvature, fastener supplying means operating automatically to deliver fasteners to all the carrying devices of the gang while they are in a predetermined position, and automatically acting mechanism for varying both the spacing of the setting devices and their disposition or arrangement more or less from a straight line after they have been so supplied.

23. A machine for setting fasteners, having, in combination, coöperating gangs of setting devices, means for supplying fasteners to all the setting devices of one gang while arranged in their initial spacing, and automatically acting mechanism for subsequently spacing the setting devices of one gang, moving the gang bodily to effect the setting operation, and then restoring the setting devices to their initial spacing.

24. A machine for setting fasteners, having, in combination, a gang of setting devices, a gang of raceways one leading to each setting device, and mechanism constructed and arranged to feed successively a hook from one raceway after another to its associated setting device.

25. A machine for setting fasteners, having, in combination, a gang of hook-carrying sets, a raceway leading to each set, and transferring mechanism constructed and arranged to act successively upon the endmost hook in one raceway after another and transfer it to its associated sets.

26. A machine for setting fasteners, having, in combination, a gang of fastener carrying devices, means for presenting a fastener in position adjacent to each device, and mechanism arranged to act successively upon the fasteners so presented and transfer them one after another to the carrying devices.

27. A machine for setting fasteners, having, in combination, a gang of fastener carrying devices, a separate transferring element associated with each carrying device, and an actuator for successively operating the transferring elements controlled by the position of the transferring element first operated.

28. A machine for setting fasteners, having, in combination, a gang of setting devices, separate transferring mechanism associated with each setting device including a reciprocatory slide, and an actuator for successively operating the slides controlled by the position of the slide first operated.

29. A machine for setting fasteners, having, in combination, a gang of setting devices, separate transferring mechanism associated with each setting device including a reciprocatory slide movable in one direction to effect the transfer of a fastener to the setting device, and an actuator for operating first one slide and then another arranged to operate so long as the slide first actuated remains out of its initial position.

30. A machine for setting fasteners, having, in combination, a gang of setting devices, transferring mechanism coöperating with each setting device including a rotatable transferring cylinder, and means for successively actuating said cylinders.

31. A machine for setting fasteners, having, in combination, a gang of setting devices, transferring mechanism coöperating with each setting device including a transferring cylinder, and an actuator for successively turning the cylinders arranged to operate while the cylinder first acting remains out of initial position.

32. A machine for setting fasteners, having, in combination, a reciprocatory plunger, coöperating gangs of setting devices one of which is carried by the plunger, transferring mechanism constructed and arranged to present fasteners one by one in alinement with the setting devices of one gang, and an actuator for the transferring mechanism constructed and arranged to be set in operation by the movement of the plunger into a predetermined position.

33. A machine for setting fasteners, having, in combination, a reciprocatory plunger, coöperating gangs of setting devices one of which is carried by the plunger, and transferring mechanism arranged to present fasteners in alinement with the setting devices of one gang and to be set in operation by the movement of the plunger toward its initial position at the conclusion of the setting operation.

34. A machine for setting fasteners, having, in combination, a plunger reciprocable to effect the setting operation, coöperating setting devices one of which is carried by the plunger, transferring mechanism for presenting a fastener to one of the setting devices, and means for automatically setting the transferring mechanism in operation actuated by the plunger in its return movement at the conclusion of the setting operation.

35. A machine for setting fasteners, having, in combination, coöperating setting devices, and mechanism for supplying a fastener to one of the devices including a raceway, an oscillatory member carrying means for transferring a fastener from said raceway to the setting device, and separate means carried by the oscillatory member for positioning the transferred fastener upon said setting device.

36. A machine for setting fasteners, having, in combination, coöperating setting devices, and mechanism for supplying a fastener to one of the devices, including an oscillatory member carrying a movable transferring finger, and also separate positioning means for the transferred fastener arranged to be operated when the oscillatory member has been turned to effect the transferring operation.

37. A machine for setting fasteners, having, in combination, coöperating setting devices, and mechanism for supplying a fastener to one of the devices, including an oscillatory member carrying a transferring finger and a positioning finger, and means for causing one finger to be retracted when the other is advanced to operative position.

38. A machine for setting lacing hooks, having, in combination, a raceway, coöperating setting devices, and mechanism for transferring a hook from the raceway to one of said setting devices including a movable carrier having a transferring finger and a positioning finger mounted therein and so connected as to move simultaneously when the carrier is in either of two predetermined positions.

39. A machine for setting lacing hooks, having, in combination, a raceway, coöperating setting devices, and mechanism for transferring a hook from the raceway to one of said setting devices including an oscillatory carrier having a transferring finger and a positioning finger geared together for movement in opposite directions, a spring tending to extend one of said fingers arranged to be placed under tension when the other finger is extended and means for causing said spring to act at a predetermined point in the cycle of the machine.

40. A machine for setting lacing hooks, having, in combination, a raceway, coöperating setting devices, and mechanism for transferring a hook from the raceway to one of said setting devices including an oscillatory cylinder having a spring actuated pinion mounted therein, a transferring finger movable under the actuation of said pinion when the cylinder is turned into initial position, and positively acting means for reversely moving the finger when the cylinder is in another position.

41. A gang fastener setting machine having, a plunger, a series of carrier bars disposed side by side, a setting die corresponding to each bar, movable spacing members disposed on opposite sides of the plunger, and separate connections from both ends of each carrier bar to one or the other of the spacing members.

42. A machine for setting fasteners in shoe uppers, having, in combination, two series of die members, one for inserting fasteners in the right quarter of a shoe and the other for inserting fasteners in the left quarter of a shoe, said die members being adjustably mounted, and a single manually operable device for simultaneously moving the die members of both series to adjust them for uppers of various sizes.

43. A machine for setting fasteners, having, in combination, a gang of setting devices, separate fastener supplying mechanism associated with each device, and a common actuator for the supplying mechanisms arranged to operate the supplying mechanisms successively, to be set in operation automatically after the setting operation, and to come to rest automatically after the last setting device has been supplied.

44. A machine for setting fasteners, having, in combination, a work table, a clamping device pivotally mounted on opposite sides of the table and having a work engaging portion extending across the table, a setting device movable relatively to work presented to the work table, and automatic means for causing the clamping device to engage the work prior to the setting operation.

45. A machine for setting a line of fasteners, having, in combination, a work table with automatically acting work clamping means mounted upon it, said work table being mounted for bodily movement transversely to the line of fasteners and with the clamping means at the conclusion of the setting operation.

46. A machine for setting fasteners, having, in combination, a reciprocatory setting device, a work support mounted for bodily movement into and out of the path of the setting device and transversely to the line of the fasteners, and means for automatically effecting such movement of the work table after the setting operation to withdraw the work.

47. A machine for setting lacing hooks, having, in combination, an upsetting die, a reciprocatory hook carrier, a transversely movable work support interposed between the die and carrier, means for clamping the work upon the support during the movement of the hook carrier in one direction, and means for effecting transverse movement of the work support during the movement of the carrier in the other direction.

48. A machine for setting fasteners, having, in combination, an upsetting die, a plunger carrying a coöperating setting device movable toward and from the upsetting die, a work table adjacent to the path of movement of the movable plunger, and work clamping means upon the table having an operative connection with the plunger.

49. A machine for setting fasteners, having, in combination, a movable setting device, fastener supplying mechanism, work clamping means, and means controlled by the position of the movable setting device for actuating the fastener supplying mechanism and the work clamping means.

50. A machine for setting fasteners, having, in combination, a movable setting device, automatic fastener supplying mechanism, and work clamping means, said means and supplying mechanism being both operatively connected to the setting device whereby movement of said device in one direction sets in operation the fastener supplying mechanism and movement in the other direction operates the work clamping means.

51. A machine for setting fasteners, having, in combination, a gang of setting devices, means for successively delivering fasteners to the setting devices of the gang, and means for automatically spacing the setting devices after they have been so supplied.

52. A machine for setting fasteners, having, in combination, a movable gang of setting devices, raceways leading to the setting devices of the gang when they occupy their initial positions, means for successively transferring one fastener from each raceway to its associated setting device, and means for automatically spacing the setting devices after they have been supplied with fasteners.

53. A machine for setting fasteners, having, in combination, two pair of coöperating gangs of setting devices, a spacing bar arranged to be turned manually and having connection with the setting devices of one gang of each pair, and a spacing bar arranged to be turned automatically and having connection with the setting devices of the other gangs.

54. A machine for setting lacing hooks, having, in combination a gang of hook-carrying sets, a separate raceway leading to each set of the gang and arranged to hold a line of hooks, and means arranged to be rendered effective with respect to one raceway after another to cause the endmost hook to be separated from the line and the sets successively to be supplied with hooks.

55. A hook setting machine of the nature described comprising a series of die members movably mounted, means for adjustably moving said members simultaneously relative to spacing and into different positions along a curve, and coöperating hook setting devices.

56. A hook setting machine of the nature described comprising a series of die members movably mounted, means for adjustably moving said members simultaneously relative to spacing and into different positions along a curve, a rotary gage device for operating said adjusting means, and coöperating hook setting devices.

57. A hook setting machine of the nature described comprising two series of die members movably mounted, means for adjustably moving the respective die members of both of said series in unison relative to spacing and into different positions along a curve, and coöperating hook setting devices.

58. A hook setting machine of the nature described comprising two series of die members movably mounted, means for adjustably moving the respective die members of both of said series in unison relative to spacing and into different positions along a predetermined curve, a single gage device for determining the movement of such adjusting means, and coöperating hook setting devices.

59. A hook setting machine of the nature described comprising a series of die members movably mounted, means for adjustably moving said members simultaneously relative to spacing and to vary the disposition and arrangement thereof more or less from a straight line, and coöperating hook setting devices.

60. A hook setting machine of the nature described comprising two series of die members movably mounted, means for adjustably moving the respective die members of both of said series in unison relative to spacing and into different positions along a predetermined curve, and coöperating hook setting devices.

61. A machine for setting fasteners, having, in combination, two pairs of coöperating gangs of setting devices, one pair constructed and arranged for setting a series of fasteners in one side of a shoe upper and the other pair for setting a series of fasteners in the other side of the upper, and a single controlling device for regulating the spacing of the setting devices in all four gangs.

In testimony whereof I have signed my name to this specification in the presence of two subscribing witnesses.

PERLEY R. GLASS.

Witnesses:
HERBERT W. KENWAY,
WILLIAM B. KING.

Copies of this patent may be obtained for five cents each, by addressing the "Commissioner of Patents, Washington, D. C."